McKee & Fletcher,
Cigar Machine.
No. 87,955. Patented Mar. 16, 1869.

Witnesses.
Sydney E. Smith.
R. J. Clay

Inventors.
John McKee and J. W. Fletcher
by Attorneys
Brown, Coombs & Co

UNITED STATES PATENT OFFICE.

JOHN McKEE AND T. W. FLETCHER, OF NEW YORK, N. Y.

IMPROVEMENT IN MACHINES FOR MAKING CIGARS.

Specification forming part of Letters Patent No. 87,955, dated March 16, 1869.

*To all whom it may concern:*

Be it known that we, JOHN McKEE and THOMAS W. FLETCHER, both of the city, county, and State of New York, have invented certain new and useful Improvements in Machines for Making Cigars; and we do hereby declare that the following is a full, clear, and exact description thereof, reference being had to the accompanying drawing, through letters of reference marked thereon, forming part of this specification, and in which—

Figure 1:
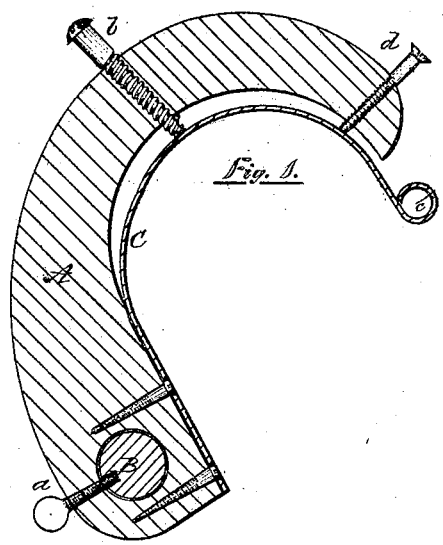
Figure 2:
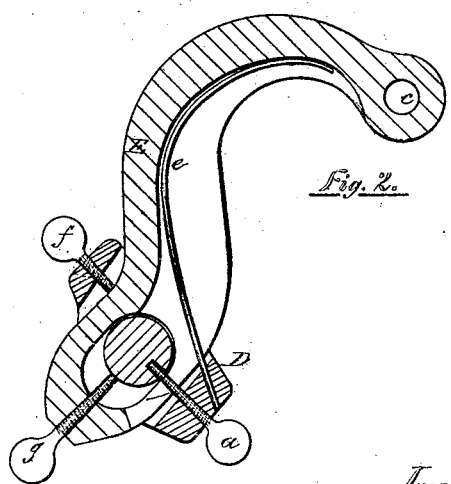

Figure 1 represents a section of the pressure-lever on the line of its motion; Fig. 2, a similar view, representing a modification of the same part.

This invention is an improvement on the machine for which a patent was granted to John Prentice, November 26, 1867, numbered 71,532, in the use of which great difficulty has been experienced in adjusting and retaining in position the front roller, which determines the size and shape of the cigar, which, according to the original construction of the machine, was difficult of adjustment, for the reason that the joints, whether tight or loose, were not under proper control, and their movements liable to sudden jerks.

To remedy these defects is the object of our present invention, either modification of which will accomplish the desired result.

To enable others to make and use our invention, we will describe it by referring to the drawing, in which—

The arm A is solid, and secured rigidly to the oscillating shaft B of the machine by a set-screw, *a*, which enters a groove in said shaft; but by slightly loosening said screw the arm may be moved longitudinally on the shaft to any position desired, and be there secured by tightening the screw.

To the inner side of the curve of this arm is attached a spring, *c*, the extremity of which is formed to receive the journal of the pressure-roller, as at *c*. The tendency of this spring is to throw the roller upward and outward. This tendency is controlled by two set-screws, *b d*, passing through the arm A, the one, *b*, acting to depress the spring, and with it the roller, thereby regulating the size of the cigar. The other screw, *d*, acts on the spring to press the roller inward, and thus give the proper "tuck" or shape to the cigar. The tendency of the spring being to keep these screws tight, there is no liability of change when once adjusted, so that uniformity of size of the cigars is insured.

By the modification represented in Fig. 2 the same ends are accomplished. In this arrangement a hub, D, is keyed or screwed upon the shaft in a similar manner, so as to be, when set in place, rigidly attached thereto, and the arm E has an adjustable motion around the shaft, with a spring, *e*, bearing on the hub D, holding its journal end upward and outward. The position of this arm E is then adjusted, as desired, by two set-screws, *f* and *g*, one of which depresses the roller to regulate the size of the cigar to be made, and the other, *g*, draws the roller inward to determine its shape.

Having thus described our invention, what we desire to secure by Letters Patent is—

1. The combination, with the arm A, of a spring, C, adjusted to position by set-screws *b d*, substantially as and for the purpose specified.

2. The combination of the fixed hub D with the vibrating arm E and spring *e*, adjustable by set-screws *f* and *g*, substantially as and for the purpose set forth.

JNO. McKEE.
T. W. FLETCHER.

Witnesses:
L. R. SMOOT,
W. T. HALL.